US007363545B1

(12) United States Patent
Jacobson et al.

(10) Patent No.: US 7,363,545 B1
(45) Date of Patent: Apr. 22, 2008

(54) SYSTEM AND METHOD FOR OVERCOMING DOWNLOAD CABLE BOTTLENECKS DURING PROGRAMMING OF INTEGRATED CIRCUIT DEVICES

(75) Inventors: Neil G. Jacobson, Mountain View, CA (US); Emigdio M. Flores, Jr., Coral Springs, FL (US); Sanjay Srivastava, San Jose, CA (US); Bin Dai, Mountain View, CA (US); Sungnien Jerry Mao, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 1231 days.

(21) Appl. No.: 10/162,239

(22) Filed: Jun. 3, 2002

(51) Int. Cl.
*G06F 11/00* (2006.01)
*G01R 31/28* (2006.01)
(52) U.S. Cl. .......................... 714/39; 714/725; 326/16
(58) Field of Classification Search ............ 326/37–41, 326/47; 714/39, 724–725
See application file for complete search history.

(56) References Cited

U.S. PATENT DOCUMENTS

| 5,635,855 | A | | 6/1997 | Tang |
|---|---|---|---|---|
| 5,869,980 | A | * | 2/1999 | Chu et al. ..................... 326/38 |
| 5,999,014 | A | | 12/1999 | Jacobson et al. |
| 6,094,063 | A | * | 7/2000 | St. Pierre et al. ............. 326/37 |
| 6,182,247 | B1 | * | 1/2001 | Herrmann et al. ............ 714/39 |
| 6,237,054 | B1 | * | 5/2001 | Freitag, Jr. .................... 710/72 |
| 6,247,147 | B1 | * | 6/2001 | Beenstra et al. .............. 714/39 |
| 6,259,271 | B1 | * | 7/2001 | Couts-Martin et al. ....... 326/40 |
| 6,286,114 | B1 | * | 9/2001 | Veenstra et al. .............. 714/39 |
| 6,326,806 | B1 | * | 12/2001 | Fallside et al. ............... 326/38 |
| 6,553,523 | B1 | * | 4/2003 | Lindholm et al. ........... 714/725 |
| 6,754,862 | B1 | * | 6/2004 | Hoyer et al. ................. 714/725 |
| 6,826,717 | B1 | * | 11/2004 | Draper et al. ................. 714/39 |

\* cited by examiner

*Primary Examiner*—Rexford Barnie
*Assistant Examiner*—Jason Crawford
(74) *Attorney, Agent, or Firm*—Patrick T. Bever; LeRoy D. Maunu

(57) ABSTRACT

A software architecture for facilitating communications between a computer or workstation and a programming apparatus used to program a PLD by minimizing the number of two-way communications on a standard download cable (e.g., RS232, USB) connected between the computer and the programming apparatus. A first component used to encode programming instructions and configuration data to form a first transmission stream that is transmitted to the programming apparatus in a single, long burst. The programming apparatus includes a second component of the software architecture that interprets the first transmission stream and programs the PLD using, for example, Boundary-Scan signals that are generated in response to the programming instructions and configuration data. A buffer memory stores data shifted out of the PLD during the programming operation, which is transmitted to the computer in a single, long burst after the first transmission stream is completed.

17 Claims, 3 Drawing Sheets

SYSTEM AND METHOD FOR OVERCOMING DOWNLOAD CABLE BOTTLENECKS DURING PROGRAMMING OF INTEGRATED CIRCUIT DEVICES

FIELD OF THE INVENTION

The present invention relates generally to the field of programmable logic devices and more particularly to an improved method for effecting operations on a programmable logic device (PLD).

BACKGROUND OF THE INVENTION

Programmable Logic Devices (PLDs) are Integrated Circuits (ICs) that are user configurable and capable of implementing digital logic operations. There are several types of PLDs, including Field Programmable Gate Arrays (FPGAs) and Complex Programmable Logic Devices (CPLDs). CPLDs typically include several function blocks that are based on the well-known programmable logic array (PLA) architecture with sum-of-products logic, and include a central interconnect matrix to transmit signals between the function blocks. Signals are transmitted into and out of the interconnect matrix through input/output blocks (IOBs).

The input/output function of the IOBs, the logic performed by the function blocks and the signal paths implemented by the interconnect matrix are all controlled by configuration data stored in configuration memory of the CPLD. FPGAs include configurable logic blocks (CLBs) arranged in rows and columns, IOBs surrounding the CLBs, and programmable interconnect lines that extend between the rows and columns of CLBs. Each CLB includes look-up tables and other configurable circuitry that is programmable to implement a portion of a larger logic function. The CLBs, IOBs and interconnect lines are configured by data stored in a configuration memory of the FPGA.

PLDs have become popular for implementing various logic functions in electronic systems that, in the recent past, were typically implemented by smaller (<100,000 gates) application specific integrated circuits (ASICs). Such functions include glue logic, state machines, data bus logic, digital signal processors and protocol functions. Early PLDs often provided insufficient capacity to implement these functions, so the significant investment of time and money to design, layout and fabricate an ASIC for these functions was justified.

However, recent advances in semiconductor and PLD technologies have produced PLDs with the necessary speed and capacity to implement these functions in most applications. Because PLDs are relatively inexpensive and can be programmed in as little as a few hours, the expense associated with the design, layout and fabrication of ASICs has become harder to justify. Further, the reprogrammability of many PLDs makes them even more attractive than ASICs because it is possible to update (reconfigure) PLDs, whereas ASICs must be replaced, and expensive new masks generated for the new ASIC designs. As such, there is a trend toward the use of PLDs in place of ASICS in electronic systems.

IEEE Standard 1149.1 and 1a entitled IEEE Standard Test Access Port and Boundary-Scan Architecture, published Oct. 21, 1993 by the IEEE under ISBN 1-55937-350-4 relates to circuitry that may be built into an IC device, such as a PLD, to assist in testing the device as well as testing the printed circuit board in which the device is placed. In addition, IEEE Standard 1149.1 is utilized in some PLDs as a convenient mechanism for transmitting configuration data to the PLD during the programming operation performed prior to normal operation. The mechanism by which IEEE Standard 1149.1 is utilized to program a PLD is well known, and therefore the particulars of this mechanism are not described herein.

FIGS. 1 and 2 show a conventional system 100 utilized to program a target PLD 150 using Boundary-Scan signals. A computer or workstation 110 is programmed with an application (software program) 210 including a programming tool 212 that generates a series of communication bursts in response to programming instructions and configuration data 214. These communication bursts are transmitted over a standard download cable 120 to a programming apparatus 130, and in particular to a signal generator 235, which generates appropriate signals used to program PLD 150. According to the conventional arrangement shown in FIG. 1, programming apparatus 130 uses a Boundary-Scan bus 140 including four signals (Boundary-Scan signals) to control PLD 150 during the programming operation: a test data input signal TDI, a test data output signal TDO, a test mode select signal TMS, and a test clock signal TCK.

Additional connections (not shown) are utilized to apply power and transmit communication control signals between programming apparatus 130 and PLD 150, which also comply with IEEE Standard 1149.1. Similar to transmissions to target PLD 150, data read from PLD 150 during the programming operation is transmitted to programming apparatus 130 on bus 140, and from programming apparatus 130 to application 210 over cable 120.

Download cable 120 utilizes one of a variety of standardized communication mechanisms that are typically available on a standard personal computer or workstation, such as serial (RS232) communications, parallel (i.e., printer type) communications, and Universal Serial Bus (USB) communications. As indicated in FIG. 2, these standardized communication mechanisms use communication ports 216 and 232, which are provided on computer or workstation 110 and programming apparatus 130, respectively. The nature of communications over download cable 120 is dependent on the particular cable type being used. However, to support a wide variety of device types, each cable/port combination introduces its own inefficiencies.

FIG. 3 is a flow diagram illustrating in a simplified manner a communication exchange between application 210 and signal generator 235 of programming apparatus 130 according to conventional methods. The communication exchange involves the process of writing configuration data to PLD 150, and then reading back the configuration data from the PLD to verify that it has been written properly. The actual order and instructions being exchanged are simplified for explanatory purposes.

Referring to the left side of FIG. 3, the programming operation begins with the transmission of a "write data" instruction from application 210 to signal generator 235 on download cable 120 (block 310). In response to this instruction, signal generator 235 generates appropriate Boundary-Scan "write data" signals (block 313) that are transmitted on bus 140 to target PLD 150 for execution (block 315). In addition, a confirmation is sent back from signal generator 235 (block 317) that is transmitted over download cable 120 to application 210.

Upon receiving the confirmation (Yes in block 319), application 210 transmits a data word to signal generator 235 on download cable 120 (block 320). Upon receiving the data word, signal generator 235 shifts in the data word on bus 140 (block 323) that are written in associated programmable cells of PLD 150 (block 325). Again, a confirmation is sent back from signal generator 235 (block 327) that is transmitted over download cable 120 to application 210.

Upon receiving the confirmation (Yes in block 329), application 210 next transmits a "read data" instruction to signal generator 235 over download cable 120 (block 330). In response, signal generator 235 generates appropriate Boundary-Scan "read data" signals (block 333) that are transmitted on bus 140 to target PLD 150 for execution (block 335). In addition, a confirmation is sent back from signal generator 235 (block 337) that is transmitted over download cable 120, which is verified by application 210 (block 337). Finally, the data word is shifted out from PLD 150 (blocks 343 and 345), and then transmitted over download cable 120 to application 210 where it is check (block 349). If the data word is written properly (Yes in block 350), then the programming process proceeds to write and check a subsequent data word. If not, then a retry operation (block 360) is executed during which corrective action is taken.

Due to inherent inefficiencies in each type of conventional download cable 120, a problem with the above conventional method is that a significant amount of transmission time is required to support communications protocol overhead. The communication protocol overhead may be generally described as the required delays between transmissions over cable 120 that are needed to coordinate two-way communication. In general, if two-way communication is performed using a lot of short two-way bursts, such as in the example described above with reference to FIG. 3, then the communication protocol overhead creates communication "bottlenecks" as each communication burst waits for its turn to be transmitted over cable 120. These bottlenecks can significantly increase the length of the PLD programming operation, resulting in low throughput rates that increase the amount of time required to manufacture products utilizing PLDs, which in turn reduces profits earned from these products.

Conventional approaches used to speed cable communications focus on having hardware designers design faster throughput cables, and using the fastest available communication port on the target system. While these conventional approaches suggest higher theoretical throughputs may be possible, in practice the communications protocol overhead and communications packet characteristics of the selected cable work against being able to achieve these high theoretical throughputs.

What is needed is a method and apparatus for reducing manufacturing times of products incorporating PLDs by increasing throughput between a programming tool installed on a computer or workstation and a programming apparatus using a standard download cable.

SUMMARY OF THE INVENTION

The present invention is directed to a software architecture for facilitating communications between a computer or workstation and a programming apparatus such that the time required to program a PLD connected to the programming apparatus is reduced by minimizing the number of two-way communications on a standard download cable connected between the computer or workstation and the programming apparatus. In particular, the software architecture includes a first component used to encode programming instructions and configuration data to form a first transmission stream (file) that is transmitted to the programming apparatus in a single, long burst. The programming apparatus includes a second component of the software architecture that interprets programming instructions sent in the first transmission stream and programs the PLD using, for example, Boundary-Scan signals that are generated in response to the programming instructions and configuration data. The programming apparatus also includes a buffer memory for storing data shifted out of the PLD during the programming operation. The shifted-out data is transmitted to the computer or workstation in a second long burst after the first transmission stream is completed (e.g., in response to an instruction provided at the end of the first transmission stream).

By encoding the programming instructions and configuration data into the first transmission stream, and by storing the shifted-out data until after the first transmission stream has been completely transmitted, the number of two-way transmission bursts between the computer or workstation and the programming apparatus are minimized. By minimizing the number of two-way transmissions between the computer and the programming apparatus, delays caused by communication protocol overhead associated with the standard download cable are minimized, thereby reducing manufacturing times of products incorporating PLDs by increasing throughput between a programming tool installed on the computer and the programming apparatus.

In accordance with an embodiment of the present invention, the first transmission stream sent from the computer and the programming apparatus includes at least one write instruction, at least one read instruction, and at least one sequence of programming data. The write instruction, read instruction and programming data are encoded to form a single transmission stream that is sent in a single long burst to the programming apparatus. The programming apparatus executes the write instruction by writing the configuration data into the PLD, and then executes the read instruction to read the configuration data back from the PLD. The configuration data read from the PLD is stored in a buffer provided on the programming apparatus. After completing the read instruction, the configuration data read from the PLD is then transmitted from the buffer over the standard download cable to the computer.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

Figure 1:
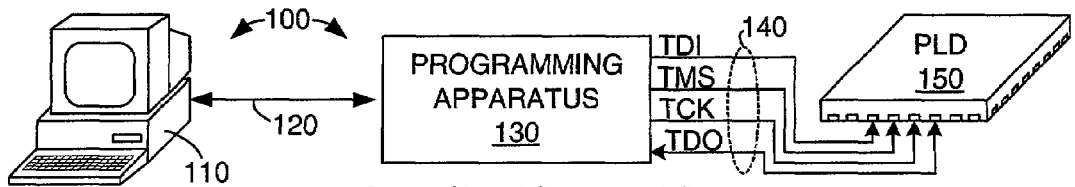
FIG. 1 is a diagram showing a conventional system for programming a PLD.
Figure 2:
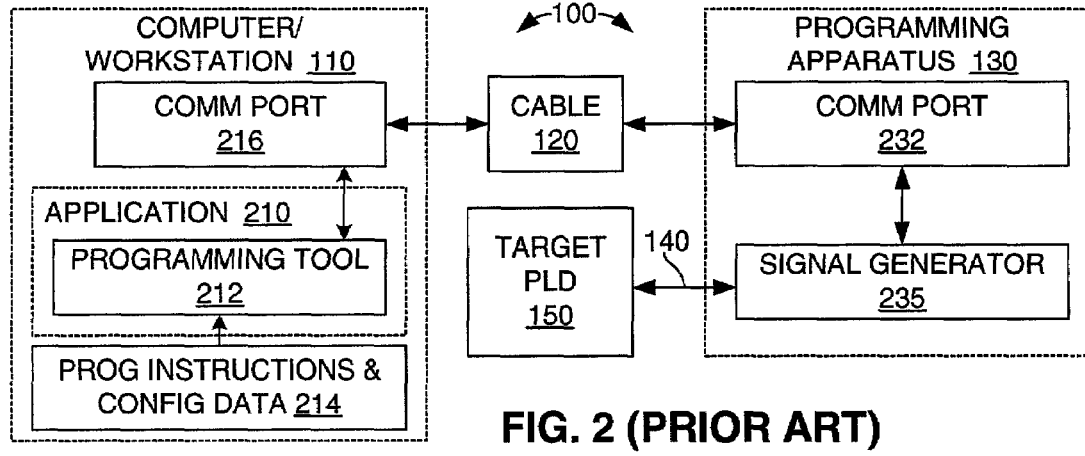
FIG. 2 is a simplified block diagram showing the system of FIG. 1 in additional detail.
Figure 4:
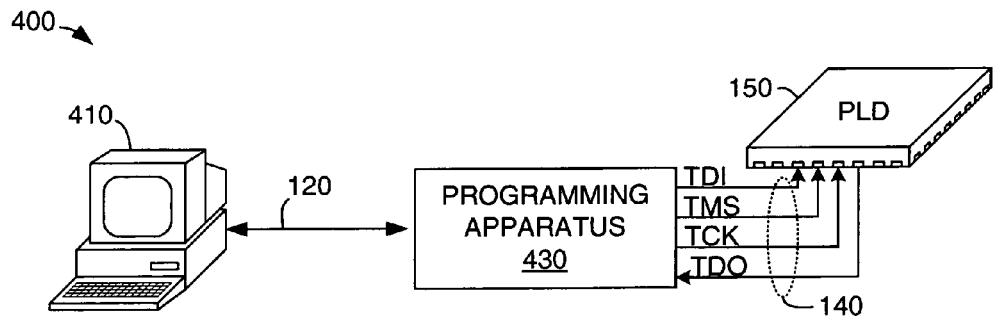
FIG. 4 is a diagram showing a system for programming a PLD in accordance with the present invention.

FIG. 4 is a diagram showing a system 400 for programming a programmable logic device (PLD) 150. System 400 includes a computer 410, a standard communication cable 120, and a programming apparatus 430. As in conventional system 100 described above, communication cable 120 is a standard download cable (e.g., RS232 or USB) that is subject to the communication protocol overhead discussed above. However, computer 410 and programming apparatus 430 are modified over conventional computer 110 and programming apparatus 130 (FIG. 1) to include a software architecture in which the application software and functions executed in programming apparatus 430 are modified to replace the series of short burst transmissions utilized in conventional systems with long burst transmissions that minimize the delays associated with communication protocol overheads. That is, the present inventors have determined that one way to make communications over standard download cables faster is to convert the short and bursty communication of the conventional method (described above) into long and bursty communication, thereby minimizing the delays caused by communication protocol overhead. Accordingly, the software architecture of the present invention reduces or avoids communication bottlenecks, thereby increasing throughput and decreasing product manufacturing costs.

Figure 5:
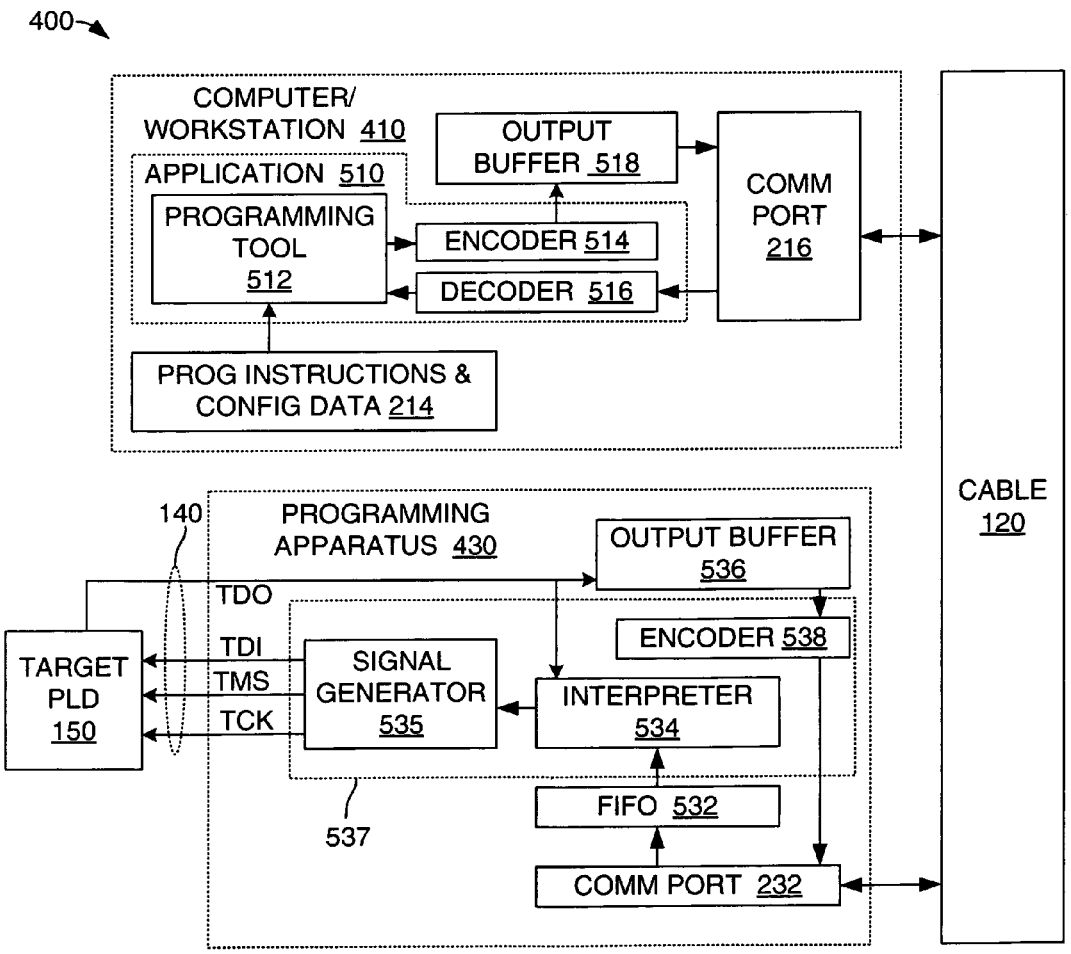
FIG. 5 is a simplified block diagram showing the system of FIG. 4 in additional detail.

FIG. 5 is a simplified block diagram showing system 400 in additional detail. In accordance with an embodiment of the present invention, several components of system 400 are essentially identical to conventional system 100 (described above), which are identified with like reference numbers. For example, computer 410 includes a program instruction and configuration data file 214 (stored in memory) and a communication port 216 that are essentially identical to those used in the conventional system, as is communication port 232 of programming apparatus 430. Note that, as in conventional system 100, communications between computer 410 and programming apparatus 430 are transmitted over standard download cable 120 (e.g., parallel, serial (RS232), or USB).

In accordance with an embodiment of the present invention, a first component of the software architecture is implemented in computer 410 as an application package 510 that includes programming tool 512, an encoder 514, and an optional decoder 516. Programming tool 512 communicates with an encoder 514 and optional decoder 516, which are provided in application 510 to facilitate long transmission bursts. One programming tool that may be modified to serve as programming tool 512 is the iMPACT configuration tool produced by Xilinx, Inc. of San Jose, Calif.

During operation, encoder 514 receives a series of programming instructions and configuration data, which are read from file 214 and arranged in an order determined by programming tool 512. Encoder 514 combines the series of programming instructions and configuration data into a single (first) communication stream that are stored in a buffer (memory) 518 for transmission to programming apparatus 430 in a single, long, one-way burst. In particular, encoder 514 utilizes a data format (byte code) that reads the programming instructions and configuration data, and encodes them with shifts and waits and other commands that facilitate configuration of PLD 150. After the data is encoded in this byte code format and buffered, the byte code is transmitted in a single, long transmission over download cable 120 to the programming apparatus 430.

A second component of the software architecture is implemented by programming apparatus 430, which includes communication port 232, a first-in first-out memory device (FIFO) 532, an interpreter 534, a signal generator 535, an output buffer 536, and an optional encoder 538. When cable 120 is a USB cable, FIFO 532 is a 64-byte device utilized to transfer 64-byte "chunks" of data between computer 410 and programming apparatus 430. Interpreter 534 receives these data bytes, and decodes the programming instructions and configuration data contained therein. In response to the programming instructions, interpreter 534 controls signal generator 535 to generate appropriate control signals that are used to control a Boundary-Scan state machine (not shown) that is implemented in PLD 150 during programming processes.

Similarly, configuration data is passed to signal generator 535, which in turn controls the TDI signal to transmit configuration data to PLD 150. If there are results that are needed (e.g., verification of programming), associated instructions are also decoded from the byte code and executed. Data shifted out of PLD 150 is routed to interpreter 534 and/or is stored in output buffer 536. At an appropriate time (i.e., after completing the transmission of programming instructions and configuration data to programming apparatus 430), the contents of output buffer 536 are transmitted in a (second) long transmission stream (file) to computer 410 via encoder 528 (if used) and cable 120.

In addition to decoding the instructions and passing data to PLD 150, interpreter 534 facilitates communication between computer 410 and programming apparatus 430 by sequencing the long-burst transmission sent from computer 410. In USB communications, the USB driver (i.e., port 216 of computer 410) will divide a long transmission into 64 byte "chunks" that are passed to programming apparatus 430. This division of the long transmission is arbitrary, so each "chunk" is transmitted separate from any preceding or subsequent "chunk".

When programming apparatus 430 receives the 64 byte packet, a state machine implemented by interpreter 534 is used to keep track of what operation is being performed and what data or instruction is expected in the subsequent transmission "chunk", thereby sequencing the discrete "chunks" of the long data transmission. Accordingly, interpreter 535 does not receive and process a series of commands or instructions at one time, but is implemented as a state machine that is shifted from state to state with each successive instruction. (In contrast, a classical interpreter receives a series of instructions that are to be interpreted, and then parses sequentially through the series of instructions.)

In the present invention, because interpreter 535 only receives 64 bytes at a time, interpreter 535 is provided with the capability of reading and organizing the 64 bytes, and when the $64^{th}$ byte is read, waiting for and reading the next 64 bytes while keeping track of the operational state established by the previous 64 bytes. In this manner, interpreter 435 provides continuity between the last byte of the first 64-byte packet and the first byte of the second 64-byte packet. This functionality is important when commands are 4, 6, 8, up to 12 bytes, and therefore may be broken between two 64-byte packets).

According to the present invention, the software architecture described above transfers much of the processing work, typically performed by application software in computer 410, to programming apparatus 430. That is, programming apparatus 430 is enabled with sufficient processing capability to implement two-way communication with target PLD 150, rather than driving the two-way communication back up to the application software and having the application software make the decisions of what to do next, and whether something is right or wrong. By encoding the programming instructions and configuration data using an algorithm that is consistent with that implemented by interpreter 535, interpreter 535 does all of the programming and test status work, and then simply returns a final result up cable 120 to the application software in a single transmission stream.

In one embodiment, programming apparatus 430 is implemented utilizing a version of the MultiLINX device, which is also produced by Xilinx, Inc., that includes the features described below. The MultiLINX device can be connected to computer 410 using a serial (RS232) or USB cable 120, and includes a microprocessor 537, memory, and an ASIC or PLD to support the communication process. To implement the second component of the software architecture of the present invention, the microprocessor of the MultiLINX device is coded with instructions that effectively cause the microprocessor and other circuitry to implement interpreter 534, signal processor 535, and optional encoder 538 (if used). Further, the MultiLINX device is provided with a large output buffer 536 that has sufficient capacity (e.g., 128K bytes) to facilitate the large amount of data transmitted from programming apparatus 430 to computer 410.

Figure 6:
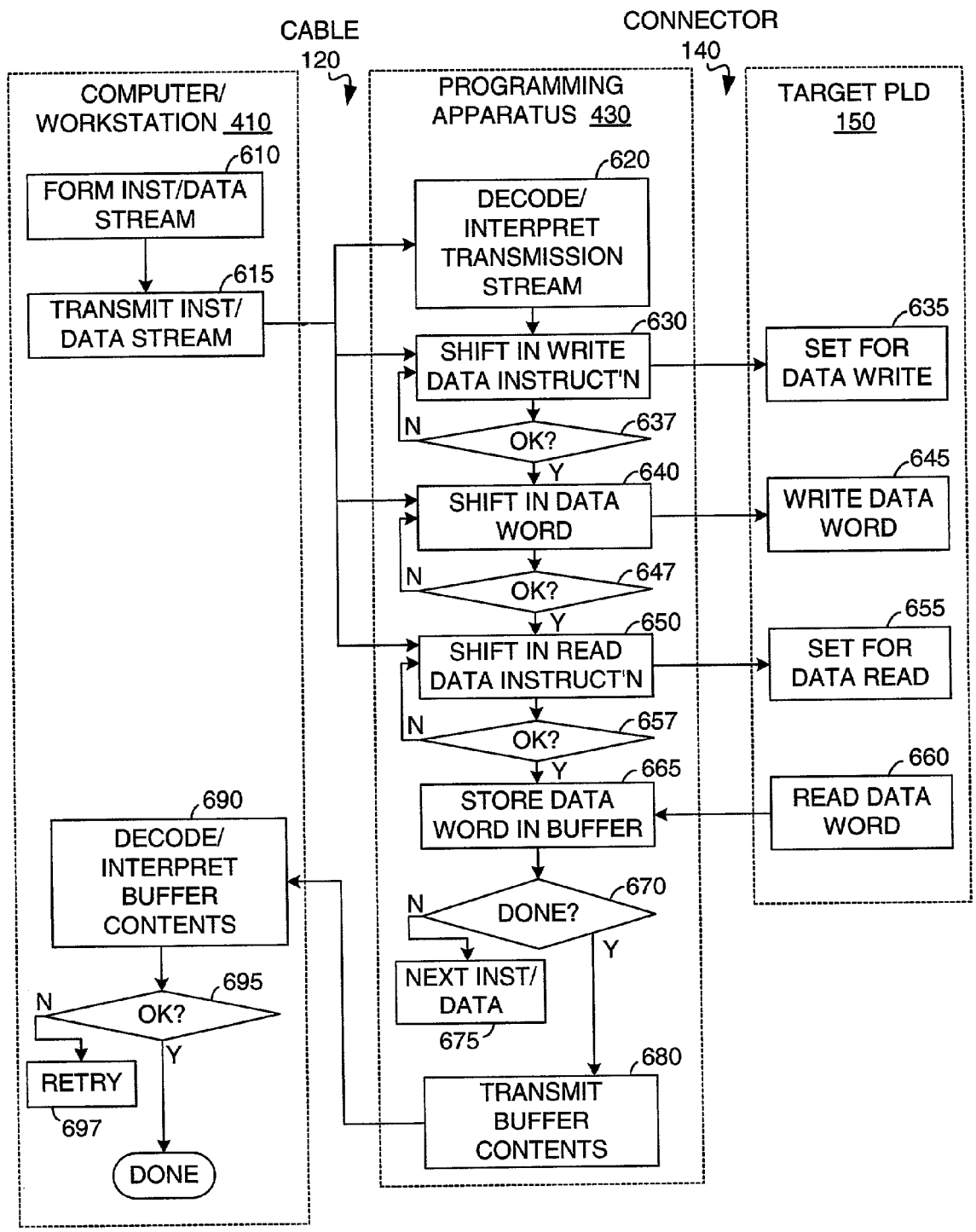
FIG. 6 is a simplified flow diagram showing communications between the components of the system of FIG. 4 during an exemplary programming operation.

FIG. 6 is a flow diagram showing a simplified example of a programming operation performed in accordance with an embodiment of the present invention. Similar to the example described above with reference to FIG. 3, the programming operation shown in FIG. 6 involves writing a series of data words to and reading the series of data words from target PLD 150. In accordance with the disclosed example, a first transmission file is formed using programming tool 512 and encoder 514 (FIG. 5) in the manner described above (block 10), which is then stored in buffer 518 and subsequently transmitted as a first transmission stream from communication port 216 onto cable 120 (block 615).

Figure 3:
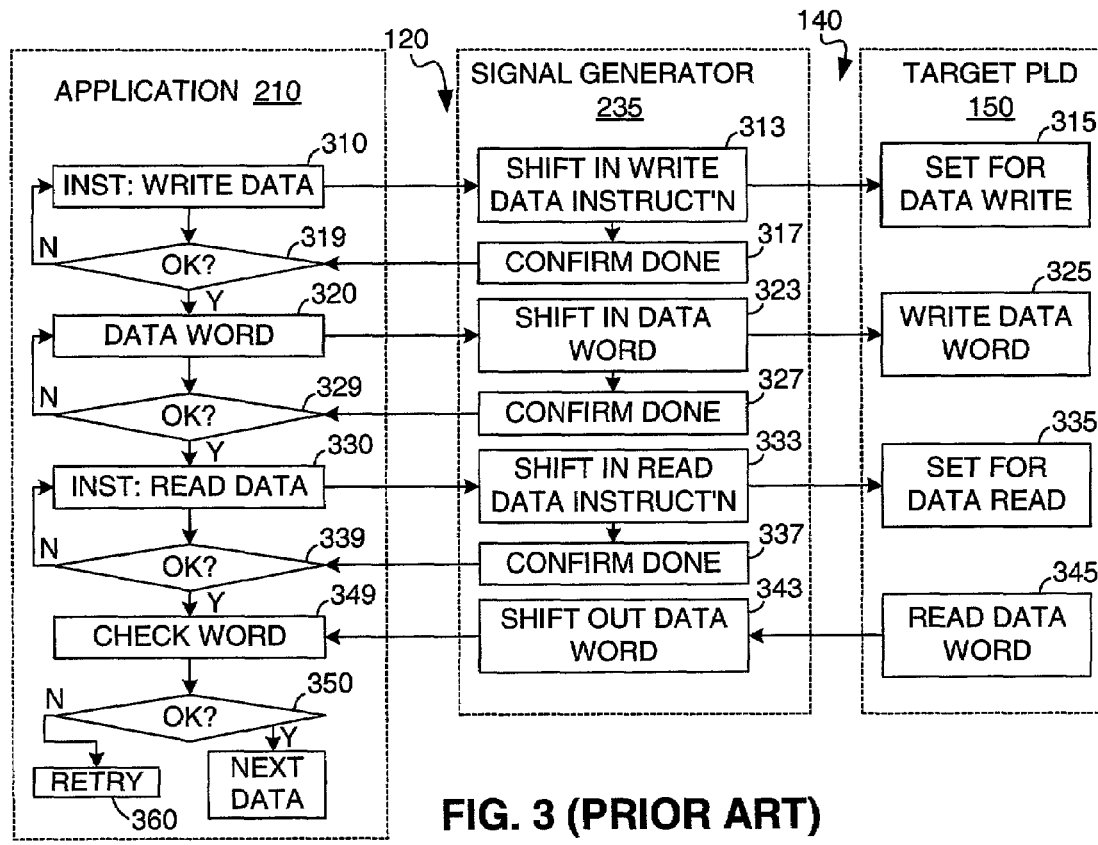
FIG. 3 is a simplified flow diagram showing communications between the components of the system of FIG. 1 during an exemplary programming operation.

Note again that this first transmission stream includes programming instructions and configuration data that is similar to those described above with reference to the conventional process shown in FIG. 3, but these instructions/data are encoded using the byte code described above. As indicated in FIG. 6, this first transmission stream is decoded and interpreted by interpreter 534 of programming apparatus 430 (block 620). In response to the decoded instructions and data, interpreter 534 controls signal generator 535 to generate appropriate Boundary-Scan signals that are transmitted to target PLD 150.

In the present example, the data stream includes a write instruction, a read instruction, and configuration data. The write instruction is interpreted and executed by transmitting appropriate shift commands over Boundary-Scan bus 140 to target PLD 150 (block 630), which is set for data write operations in response to these shift commands (block 635). Unlike the conventional method, verification that the write instruction was shifted into PLD 150 is performed by interpreter 534 (block 637), not by the application running on computer 410, thereby reducing the need for two-way communication. This verification process is performed, for example, by encoding the first transmission stream with the information required to both shift out the device data and supply the compare data. In this manner the device contents can be verified at the device (i.e., by the cable) rather than by the host.

Next, the data word is shifted into PLD 150 (blocks 640 and 645), and verification is again performed (block 647). Finally, the read instruction is interpreted from the first transmission stream and shifted into PLD 150 (blocks 650 and 655), and verification is again performed (block 657). The data word is then shifted out of PLD 150 (block 660) and stored in buffer 536 (see FIG. 5).

If additional write and read instructions are present in the first transmission stream (No in block 670), then the above process is repeated for each configuration data word (block 675). Upon completing the transmission of the first transmission stream, the data stored in buffer 536 is then transmitted to computer 410 as a second long transmission stream (680).

In one embodiment, the data is encoded prior to transmission by optional encoder 538, which generates a byte code similar to that generated by encoder 514. The second transmission file is then decoded and/or interpreted by computer 410 (block 690), which then detects errors, if any, in the programming process by comparing the data read from PLD 150 to that written to PLD 150. If an error occurs (No in block 695), then one or more corrective processes may be executed according to known techniques (block 697).

Although the present invention has been described with respect to certain specific embodiments, it will be clear to those skilled in the art that the inventive features of the present invention are applicable to other embodiments as well, all of which are intended to fall within the scope of the present invention. For example, although bus 140 is described as a Boundary-Scan bus, other communication types are possible for communication between programming apparatus 430 and target PLD 150. Further, although the software apparatus of the present invention has been described with reference to programming PLDs, other functions performed using Boundary-Scan methods (e.g., device or system testing) may also be performed using the communication techniques described herein.

The invention claimed is:

1. A method for programming a programmable logic device using a system including a computer and programming apparatus connected by a standard download cable, wherein the method comprises:

forming a first transmission file including a series of programming instructions and configuration data;

transmitting the first transmission file from the computer to the programming apparatus over the standard download cable, whereby the programming apparatus is controlled by the first transmission file to transmit the configuration data into the programmable logic device in response to the programming instructions;

inputting a command and accompanying configuration data from the programming apparatus into the PLD in response to interpretation of each programming instruction by the programming apparatus;

after inputting each command and before commencing the inputting of another command, verifying by the programming apparatus that the command has been input to the PLD;

wherein the inputting and verifying the input of each command are performed without communicating from the programming apparatus back to the computer;

forming a second transmission file including data shifted out of the programmable logic device in response to the programming instructions; and transmitting the second transmission file from the programming apparatus to the computer over the standard download cable when the transmission of first transmission file is completed.

2. The method according to claim 1, wherein forming the first transmission file comprises encoding the series of programming instructions and configuration data to form said first transmission file.

3. The method according to claim 1, wherein executing each of the programming instructions comprises transmitting Boundary-Scan signals that are applied to the programmable logic device.

4. The method according to claim 1, wherein forming the second transmission file comprises storing the data shifted out of the programmable logic device in a buffer.

5. The method according to claim 4, wherein transmitting the second transmission file comprises encoding the data shifted out of the programmable logic device.

6. A method for programming a programmable logic device using a system including a computer and programming apparatus connected by a standard download cable, wherein the method comprises:
  transmitting a first transmission file from the computer to the programming apparatus over the standard download cable, wherein the first transmission file includes a plurality of write instructions, a plurality of read instructions, and a plurality of configuration data words;
  writing the plurality of configuration data words from the programming apparatus into the programmable logic device in response to the plurality of write instructions, and reading the plurality of configuration data words from the programmable logic device in response to the plurality of read instructions;
  wherein the writing and reading include:
    inputting a command from the programming apparatus into the PLD in response to interpretation of each programming instruction by the programming apparatus;
    after inputting each command and before commencing the inputting of another command, verifying by the programming apparatus that the command has been input to the PLD; and
    wherein the inputting and verifying the input of each command are performed without communicating from the programming apparatus back to the computer;
  storing the plurality of configuration data words read from the programmable logic device in a buffer provided on the programming apparatus; and
  after all of the plurality of data words are written to and read from the programmable logic device, forming a second transmission file from data in the buffer and transmitting the second transmission file from the programming apparatus to the computer over the standard download cable.

7. The method according to claim 6, further comprising forming the first transmission file by encoding the plurality of write instructions, the plurality of read instructions, and the plurality of configuration data words into a byte code.

8. The method according to claim 6, wherein transmitting the first transmission file includes interpreting and executing each of the plurality of write instructions and plurality of read instructions as these instructions are received by the programming apparatus.

9. The method according to claim 6, wherein writing and reading comprises generating Boundary-Scan signals that are applied to the programmable logic device.

10. The method according to claim 6, wherein transmitting the second transmission file comprises encoding the data shifted out of the programmable logic device.

11. A system for programming a programmable logic device including a computer and a programming apparatus connected by a standard download cable, wherein the system comprises:
  means for forming a first transmission file in the computer, the first transmission file including a series of programming instructions and configuration data;
  means for transmitting the first transmission file from the computer to the programming apparatus over the standard download cable;
  means provided on the programming apparatus for interpreting the first transmission file and for transmitting the configuration data into the programmable logic device in response to the programming instructions;
  means for inputting a command and accompanying configuration data from the programming apparatus into the PLD responsive to the means for interpreting;
  means for verifying by the programming apparatus that the command has been input to the PLD after inputting each command and before commencing the inputting of another command;
  wherein the means for inputting and the means for verifying the input of each command operate without communicating from the programming apparatus back to the computer;
  means for forming a second transmission file including data shifted out of the programmable logic device in response to the programming instructions; and
  means for transmitting the second transmission file from the programming apparatus to the computer over the standard download cable when the transmission of first transmission file is completed.

12. The system according to claim 11, wherein said means for forming the first transmission file comprises an encoder for encoding the series of programming instructions and configuration data to form said first transmission file.

13. The system according to claim 12, wherein the computer includes a buffer for storing the first transmission file before transmission to the programming apparatus.

14. The system according to claim 11, wherein said means for interpreting provided on the programming apparatus comprises a microprocessor.

15. The system according to claim 14, wherein the microprocessor is coded to execute each of the programming instructions by generating Boundary-Scan signals that are applied to the programmable logic device.

16. The system according to claim 11, wherein the means forming the second transmission file comprises a buffer for storing the data shifted out of the programmable logic device.

17. The system according to claim 16, wherein the means forming the second transmission file further comprises an encoder for encoding the data shifted out of the programmable logic device before transmission to the computer.

* * * * *